United States Patent
Tseng

[11] Patent Number: 5,927,663
[45] Date of Patent: Jul. 27, 1999

[54] TABLE MOUNT HAND AND ARM SUPPORT FOR OPERATING A MOUSE

[76] Inventor: Hui-Min Tseng, No. 8, Alley 27, Lane 46, Chi-Feng Rd., Wu-Feng Hsiang, Taichung Hsien, Taiwan

[21] Appl. No.: 09/128,013

[22] Filed: Aug. 3, 1998

[51] Int. Cl.⁶ .................................................. B43L 15/00
[52] U.S. Cl. ........................................ 248/118.5; 248/918
[58] Field of Search .............................. 248/346.01, 118, 248/118.1, 118.3, 118.5, 918; 400/715

[56] References Cited

U.S. PATENT DOCUMENTS

| | | | |
|---|---|---|---|
| 1,266,367 | 5/1918 | Wilson | 248/118 |
| 1,516,795 | 10/1924 | Schwarting | 248/118 |
| 2,477,898 | 8/1949 | Rehman et al. | 248/118 |
| 5,072,905 | 12/1991 | Hyatt | 248/918 |
| 5,074,501 | 12/1991 | Holtta | 248/118.3 |
| 5,104,073 | 4/1992 | VanBeek et al. | 248/118.3 |
| 5,135,190 | 8/1992 | Wilson | 248/118.1 |
| 5,161,760 | 11/1992 | Terback | 248/118 |
| 5,320,317 | 6/1994 | Hyatt | 248/118.1 |
| 5,385,322 | 1/1995 | Kim et al. | 248/118 |
| 5,402,972 | 4/1995 | Schmidt | 248/918 |
| 5,405,109 | 4/1995 | Nordnes | 248/918 |
| 5,655,814 | 8/1997 | Gibbs | 248/118 |
| 5,743,499 | 4/1998 | Wang | 248/918 |

*Primary Examiner*—Derek J. Berger
*Assistant Examiner*—Michael Nornberg
*Attorney, Agent, or Firm*—Bacon & Thomas, PLLC

[57] ABSTRACT

A table support mounted on the top plate of a desk to support the user's hand and arm when operating a mouse on the top plate, the table mount hand arm support including a mounting frame mounted on the top plate of the desk, the mounting frame having a top trough attached to the top plate of the desk at the top and a plate spaced below the top trough, a tension clamp mounted on the plate of the mounting frame to fix the mounting frame to the top plate of the desk, and a movable bearing device supported on the mounting frame and moved in the top trough for supporting the user's hand and arm, the movable bearing device including a movable bearing plate moved within the top trough, the movable bearing plate having a recessed plate body for supporting the user's hand and arm and a plurality of ball and socket assemblies provided at the recessed plate body at a bottom side and moved with the recessed plate body in the top trough.

2 Claims, 4 Drawing Sheets

Fig·1

TABLE MOUNT HAND AND ARM SUPPORT FOR OPERATING A MOUSE

BACKGROUND OF THE INVENTION

The present invention relates to a table mount hand and arm support that can be conveniently fastened to the top plate of a computer desk or the like to support the hand and arm when the user moves a mouse on the top plate of the computer desk.

When operating a mouse to control a cursor on a monitor of a computer system, the hand and arm are suspended in the air, the muscles of the hand and arm and the related nerves and joints are constantly maintained at high tension. Therefore, the muscles get tired quickly when moving a mouse on the top plate of a computer desk or a mouse pad above it. Various protective means have been disclosed for protecting the wrist, the fingers, or the elbow when operating a mouse. However, these protective means are complicated and expensive.

SUMMARY OF THE INVENTION

It is the main object of the present invention to provide a table mount hand and arm support which can be conveniently mounted on the top plate of a desk to support the user's hand and arm, and which moves a mouse on the top plate. It is another object of the present invention to provide a table mount hand and arm support which enables the user to comfortably operate a mouse on a desktop. To achieve these and other objects of the present invention, there is provided a table mount hand and arm support which comprises a mounting frame mounted on the top plate of the desk, the mounting frame having a top trough attached to the top plate of the desk at the top and clamping plate means spaced below the top trough, tension clamp means mounted on the clamping plate means to fix the mounting frame to the top plate of the desk, and a movable bearing device supported on the mounting frame and moved in the top trough for supporting the user' hand and arm, the movable bearing device including a movable bearing plate moved within the top trough, the movable bearing plate having a recessed plate body for supporting the user's hand and arm and a plurality of ball and socket assemblies provided at the recessed plate body at a bottom side and moved with the recessed plate body in the top trough.

DETAILED DESCRIPTION OF THE PREFERRED EMBODIMENT

Figure 1:
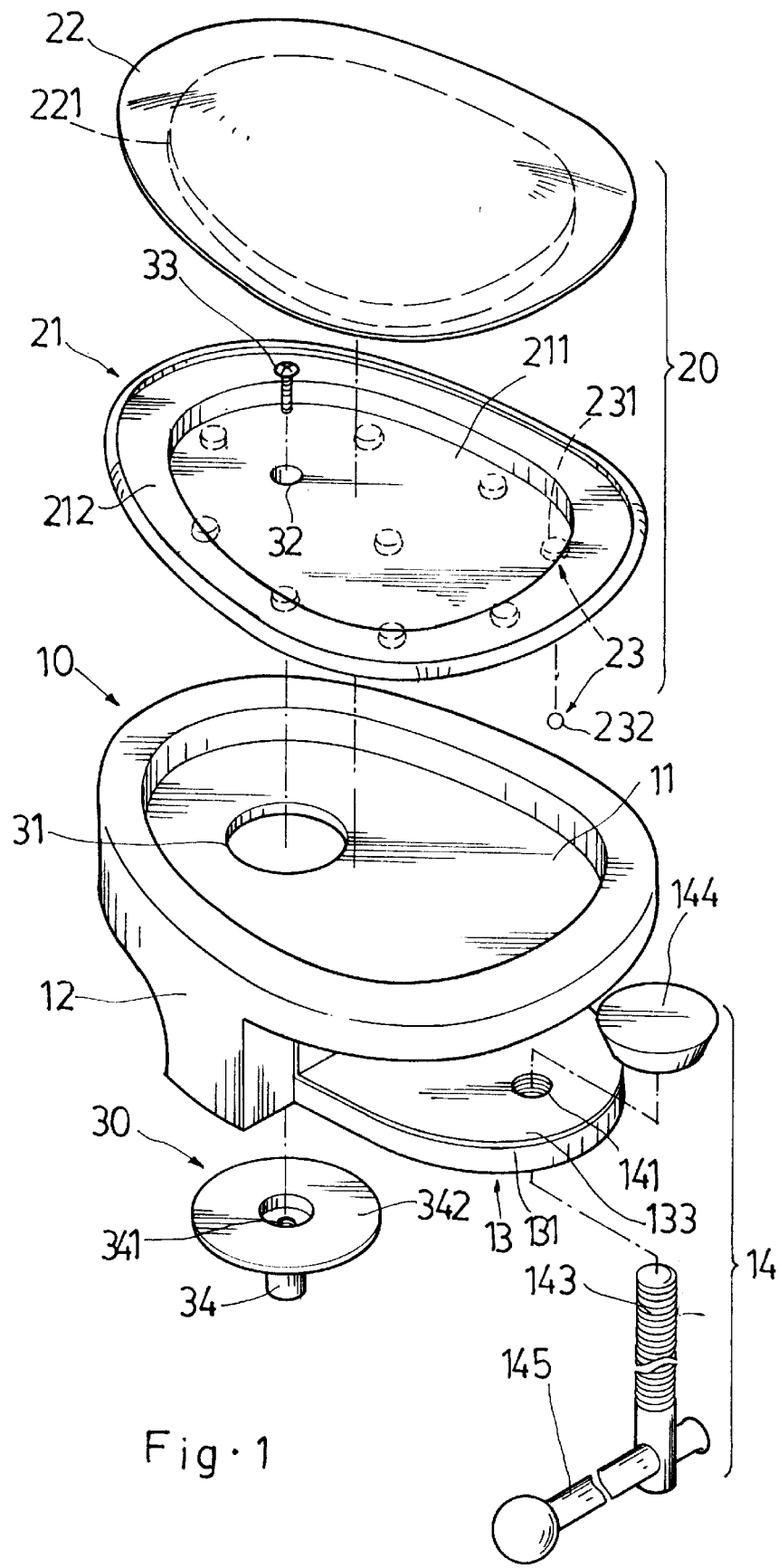
FIG. 1 is an exploded view of a table mount hand and arm support according to the present invention.
Figure 2:
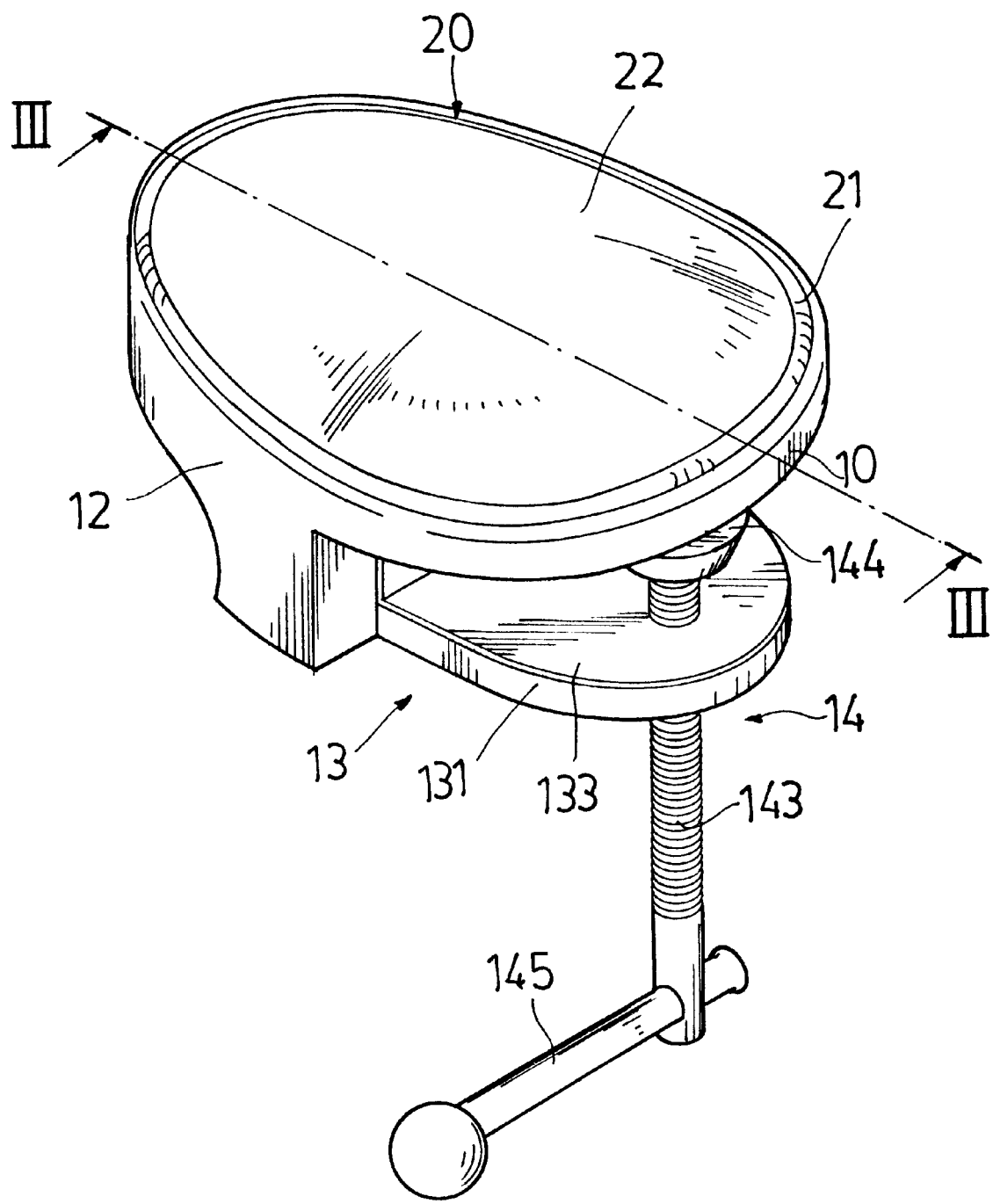
FIG. 2 is a perspective assembly view of the table mount hand arm support shown in FIG. 1.
Figure 3:
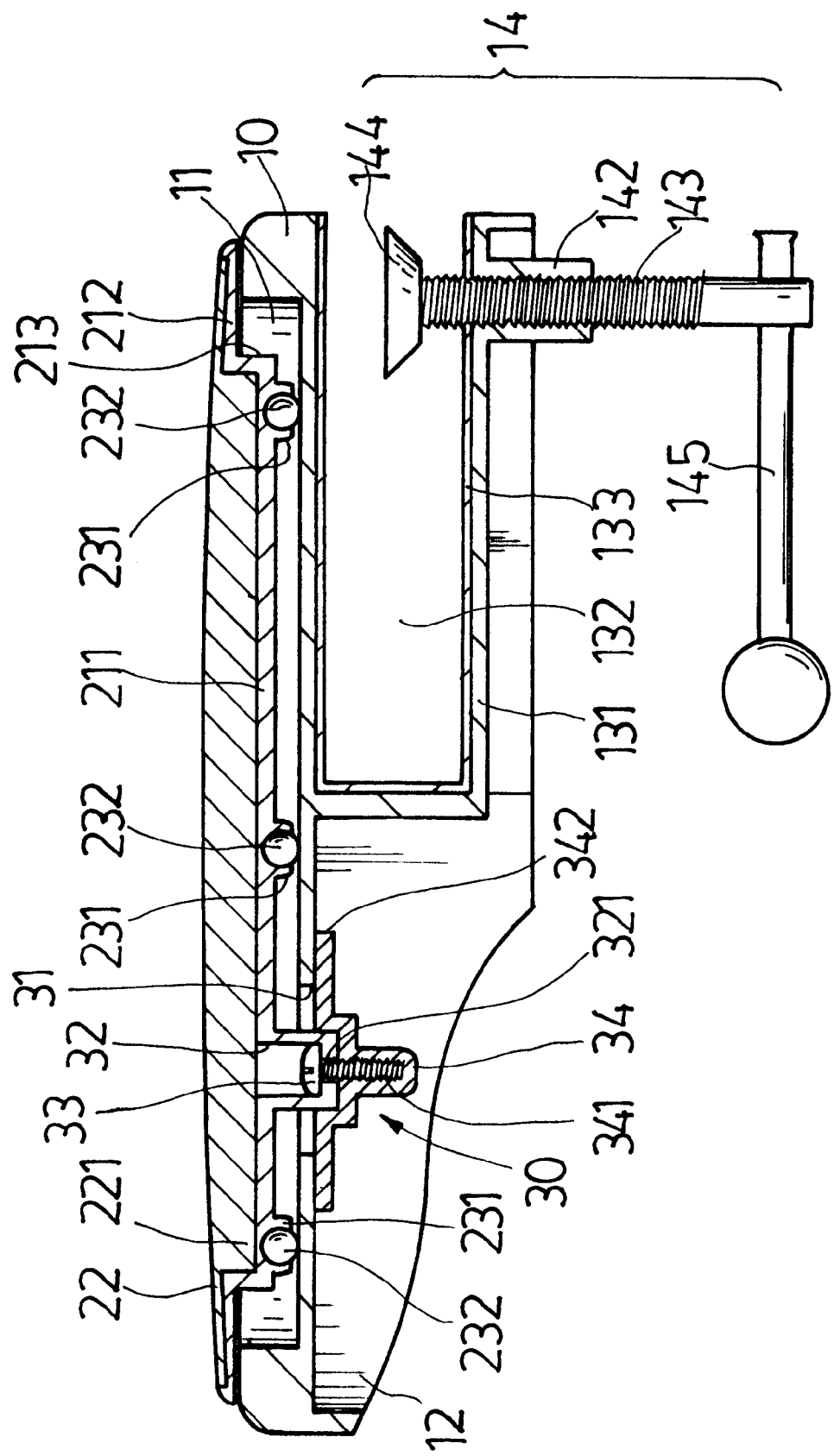
FIG. 3 is a sectional view taken along line III—III of FIG. 2.

Referring to FIGS. 1, 2 and 3, a table mount hand and arm support is generally comprised of a mounting frame 10 for mounting on the top of, for example, a computer desk, a movable bearing device 20 for supporting the user's hand and arm on the mounting frame 10, a locating device 30 for securing the movable bearing device 20 to the base mounting frame 10, and a tension clamp 14 for securing the base mounting frame 10 to the top of, for example, a computer desk.

The mounting frame 10 comprises an arched frame base 12, a top trough 11 integral with the arched frame base 12 at the top, a flat bottom plate 13 extended from the frame base 12 at one side, the flat bottom plate 13 comprises a plate body 131 and a metal lining 133 covered on the plate body 131, a clamping space 132 defined between the bottom side wall of the top trough 11 and the metal lining 133 in front of the frame base 12, a vertical barrel 142 integral with the metal lining 133 and downwardly extended out of a hole (not shown) on the plate body 131, the barrel 142 defining a screw hole 141, and a locating hole 31 formed through the top tough 11 and the frame base 12. The tension clamp 14 is comprised of a screw rod 143 threaded into the screw hole 141 of the barrel 142 from the bottom side, a handle 145 fastened the bottom end of the screw rod 143 for turning by a user, a stop block 144 fixedly fastened to the top end of the screw rod 143 and moved with the screw rod 143 in the clamping space 132 relative to the bottom side wall of the top trough 11. The movable bearing device 20 is comprised of a movable bearing plate 21 movably mounted in the top tough 11 of the mounting frame 10, and a soft pad 22 covered on the movable bearing plate 21. The movable bearing plate 21 comprises a recessed plate body 213 received in the top trough 11 of the mounting frame 10, the recessed plate body 213 defining a top open chamber 211, a rim 212 outwardly raised from the periphery of the recessed plate body 213 at the top and supported above the top peripheral edge of the top trough 11, a downward extended barrel 32 integral with the recessed plate body 213 and inserted into the locating hole 31 of the mounting frame 10, the barrel 32 having an opened top side and a closed bottom side and a through hole 321 at the center of the closed bottom side, and a plurality of ball and socket assemblies 23, each ball and socket assembly 23 comprising a ball socket 231 integral with the bottom side wall of the recessed plate body 213 and a steel ball 232 rotatably mounted in the ball socket 231 and partially maintained in close contact with the inside wall of the top trough 11. The size of the recessed plate body 213 is smaller than the holding space of the top trough 11, therefore the movable bearing plate 21 can be moved within the top trough 11. The outer diameter of the downward extended barrel 32 is smaller than the diameter of the locating hole 31 of the mounting frame 10. The flexible cover plate 22 is covered on the rim 212 of the movable bearing plate 21, having an endless, downwardly extended coupling flange 221 raised from the bottom side wall thereof and tightly engaged into the top open chamber 211. The locating device 30 comprises a cap nut 34 having a center screw hole 341 and an outward flange 342 raised around the center screw hole 341 at one end. A screw 33 is mounted in the through hole 321 of the downwardly extended barrel 32 and threaded into the screw hole 341 of the cap nut 34 to secure the movable bearing plate 21 to the top trough 11 of the mounting frame 10. When the movable bearing device 20 is coupled to the mounting frame 10 by the screw 33 and the cap nut 34, the movable bearing device 20 is allowed to be moved within the top trough 11. Further, the pitch between the outer diameter of the downwardly extended barrel 32 and the diameter of the round hole 31 at the top trough 11 is equal to the pitch between the outer diameter of the recessed plate body 213 of the movable bearing plate 21 and the inner diameter of the top trough 11.

Figure 4:
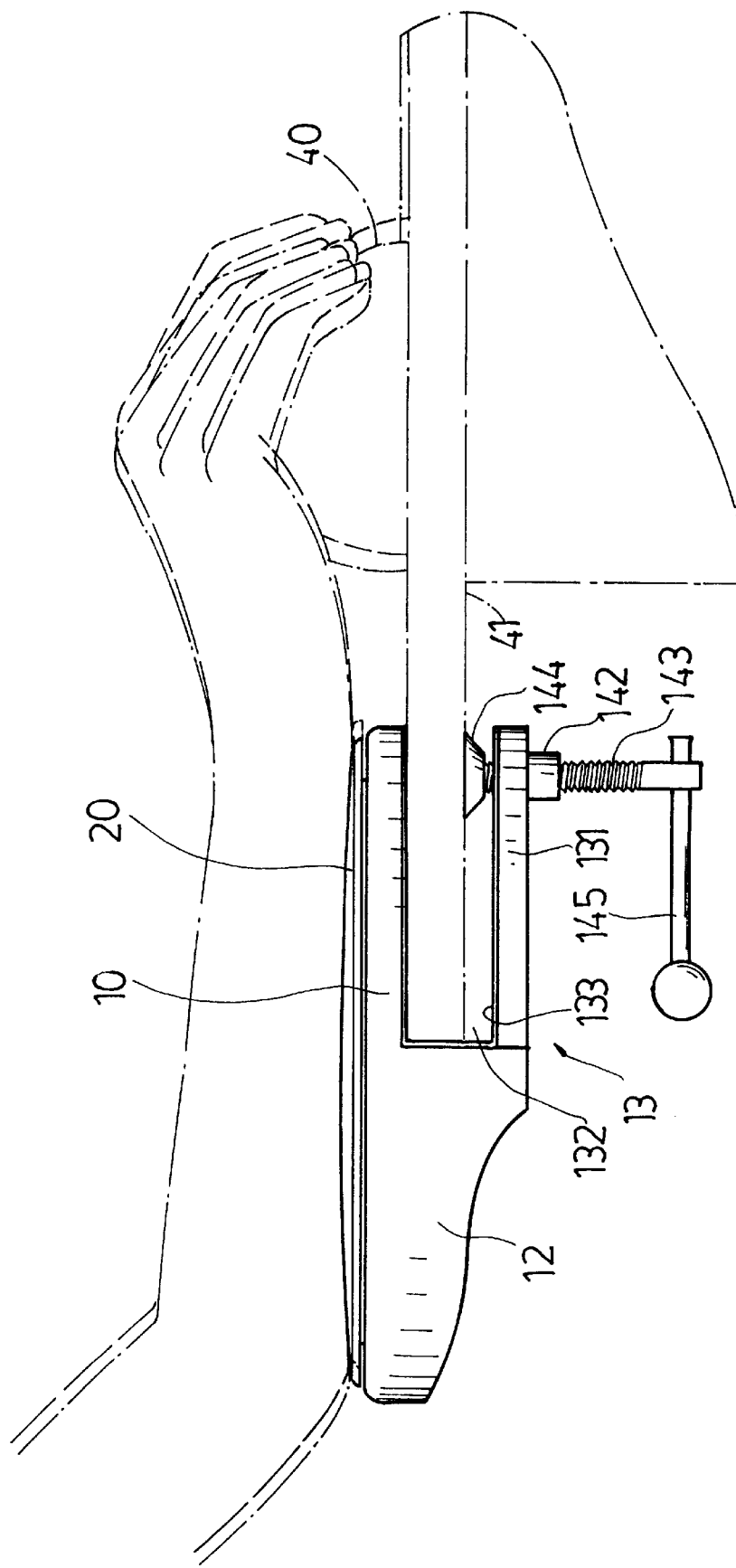
FIG. 4 is an applied view of the present invention, showing the table mount hand arm support fastened to the table top, the user's hand and arm being supported and moved on the table mount hand and arm support.

Referring to FIG. 4, when in use, the mounting frame 10 is attached to the top plate 41 of the computer desk, permitting the top plate 41 to be received in the clamping space 132 between the bottom side wall of the top trough 11 and the stop block 144 of the tension clamp 14, then the handle 145 is turned to fasten up the tension clamp 14. When the user operates a mouse 40 on the top plate 41 or a mouse pad above the top plate 41 with the hand and arm, the forearm can be supported on the flexible cover plate 22 of the movable bearing device 20. Because the movable bearing device 20 is supported in the top trough 11 by the balls 232, the movable bearing device 20 can be smoothly moved with the hand and arm in the top trough 11 without causing a noise. Because the forearm is supported on the movable bearing device 20, the user can comfortably operate the mouse 40.

What I claim is:

1. A table mount hand and arm support for operating a mouse, the support comprising:
   a) a frame for mounting on a desk top, the frame including a top trough attachable to the top of the desk and having a top peripheral edge, and a plate means spaced below the top trough;
   b) a tension clamp means mounted on the plate means for securing the frame to the desk top; and
   c) a movable bearing device mounted on the frame, the bearing device including a recessed plate body disposed within the top trough, the recessed plate body having a top side and a bottom side, the top side including an outwardly extending rim supported on the top peripheral edge of and above the top trough, and the bottom side being provided with a plurality of ball and socket assemblies.

2. A table mount hand and arm support for operating a mouse, the support comprising:
   a) a frame for mounting on a desk top, the frame including a top trough attachable to the top of the desk and having a top peripheral edge, and a plate means spaced below the top trough;
   b) a tension clamp means mounted on the plate means for securing the frame to the desk top;
   c) a movable bearing device mounted on the frame, the bearing device including a recessed plate body disposed within the top trough, the recessed plate body having a top side and a bottom side, the top side including an outwardly extending rim supported on the top peripheral edge of and above the top trough, and the bottom side being provided with a plurality of ball and socket assemblies; and
   d) locating means coupling the recessed plate body to the frame and enabling the movable bearing device to be moved in the top trough.

* * * * *